United States Patent Office 3,337,274
Patented Aug. 22, 1967

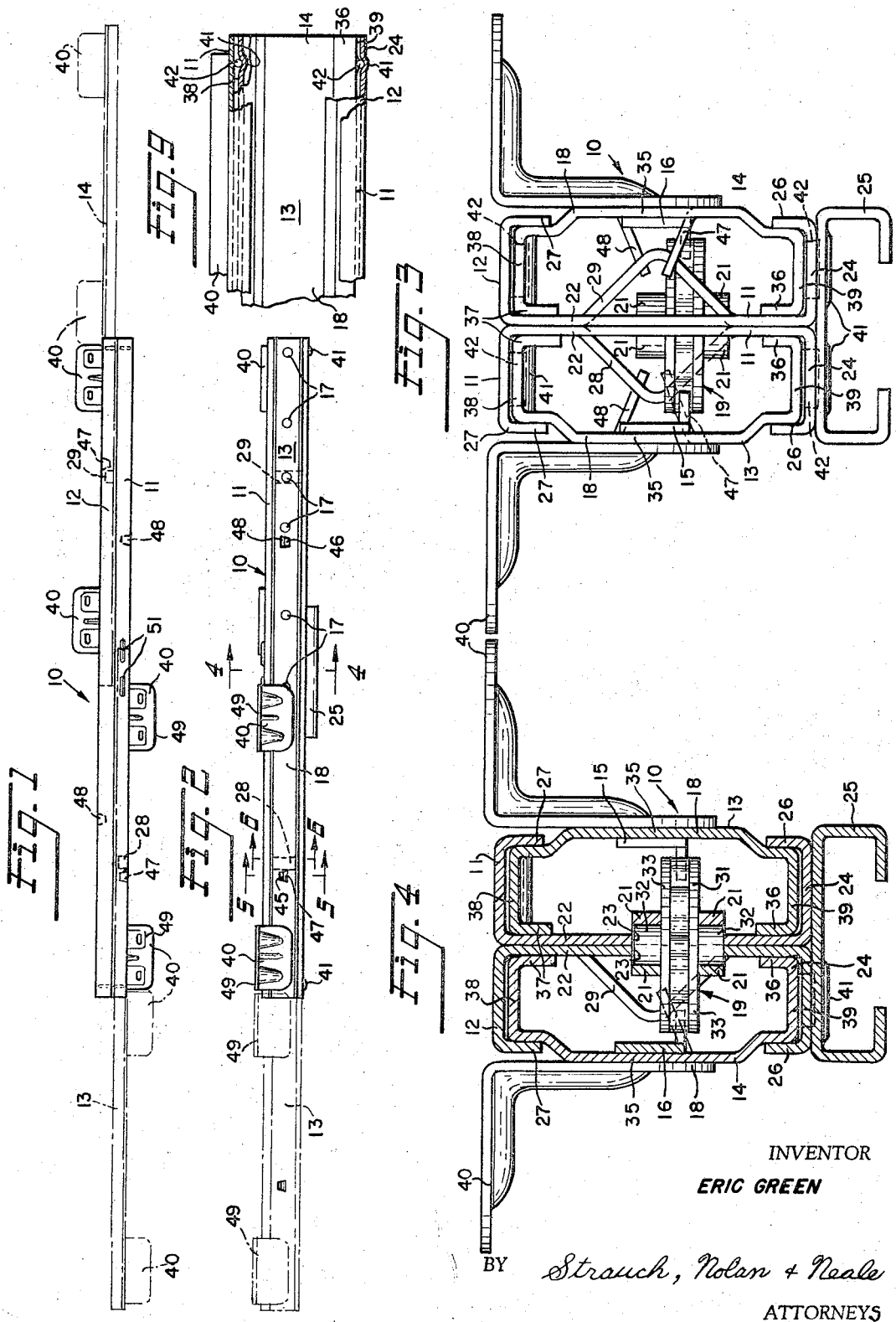

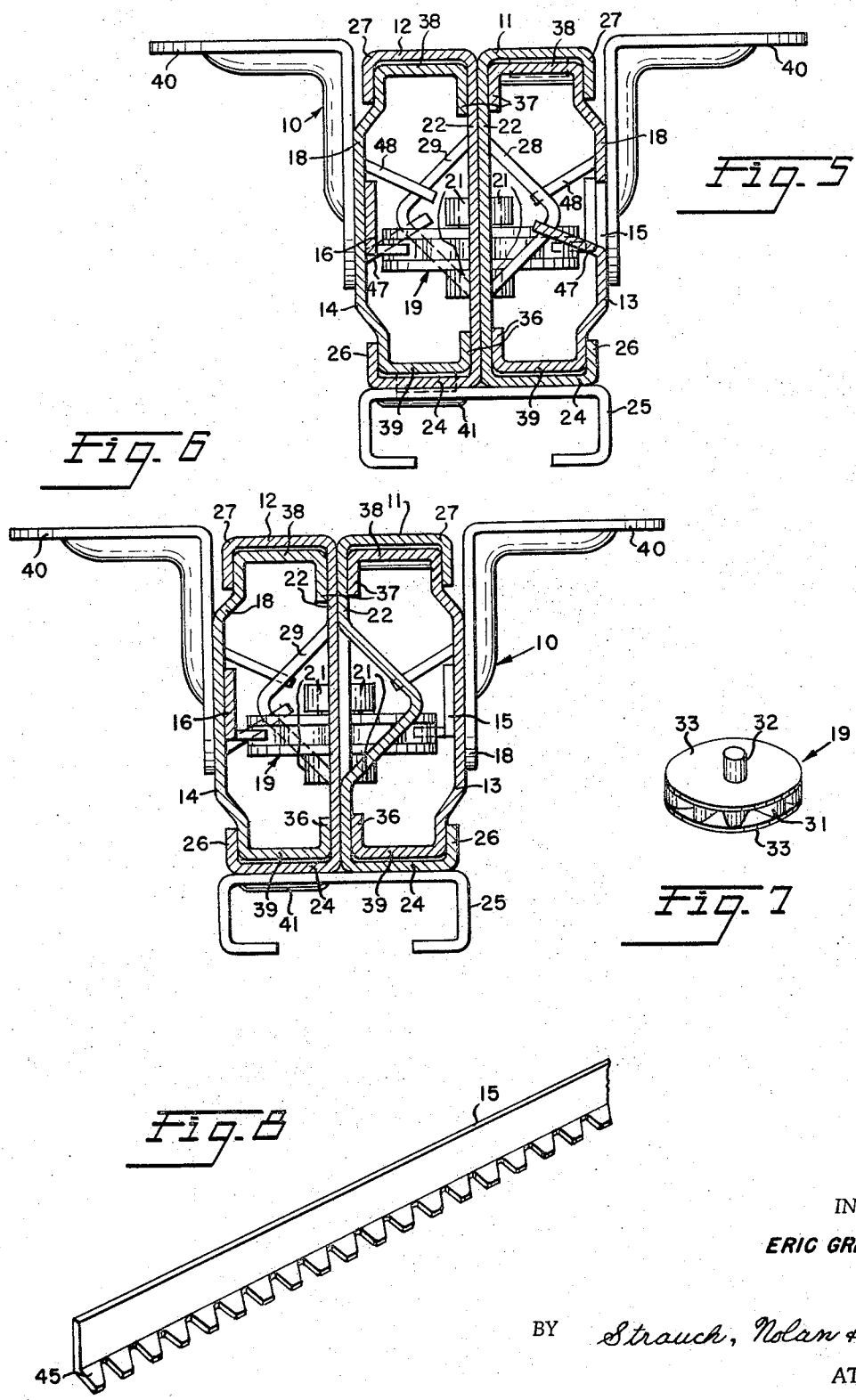

3,337,274
EQUALIZER SLIDE EXTENSION FOR TABLES
Eric Green, 120 Privette St., Statesville, N.C. 28677
Filed Jan. 19, 1965, Ser. No. 426,607
5 Claims. (Cl. 308—3.6)

The present invention relates to extension table slides and more particularly to improved equalizer slide extensions for tables having center pedestal or similar centered support bases.

In such center base tables, the main table top boards are fixed to the movable slides which telescope in and out of the stationary slide channels fixed to the center base. As a consequence, the movable slides in their extended position protrude substantially from the ends of their respective stationary slide channels and form in effect cantilever support arms for the extended main table top boards. The weight of the extended portions of the movable slides and the main table top boards mounted in end overhanging relation to the outer protruding ends of the movable slides tends to cant the movable slides downwardly with respect to their stationary guide channels. Unless this downward canting tendency is suitably counteracted, the table top composed of the center supported insert leaves and the extended main table top boards will assume a convex configuration, a substantial frictional drag will be created between the movable slides and their respective stationary slide channels, and the equalizing gear and rack mechanism employed in such equalizer slides will undergo destructive twisting stresses.

It, accordingly, is a primary object of the present invention to provide an equalizer slide extension for tables with gear and rack mounting means and slide bearing elements that will assure long life, relative free sliding movement between the movable slides and their respective stationary slide guide channels without damage to the gear and rack mechanism.

A further important object of this invention resides in providing an equalizer slide extension for tables wherein the equalizer gear is directly rotatably mounted by mating journal formations struck out of the abutting side walls of the stationary slide guide channels.

A further major object of this invention resides in providing an equalizer slide extension for tables with pocketed bearing rollers (1) in the lower walls of the stationary slide guide channels adjacent the entry ends through which the movable slides pass and (2) in the upper walls of the movable slides at their trailing ends to assure free sliding movement of the movable slides and to minimize canting of the movable slides when in the extended positions.

Still another object of the present invention resides in providing an equalizer gear assembly composed of a toothed gear wheel having oppositely directed stub axles, respective side face plates loosely associated with the oppositely directed stub axles to permit limited relative vertical movement of a meshing rack bar, and loose fitting stub axle journal sockets to permit limited lateral tilting movement of the gear wheel in operation to accomodate relative vertical movement of the respective rack bars without destructive stressing of the gear assembly or frictional binding between the gear wheel and its meshing rack bars.

Further objects will appear from the following description and appended claims when read in conjunction with the appended drawings wherein:

FIGURE 1 is a top plan view of an equalizer slide extension embodying the present invention showing in solid lines the non-extended position of the movable slides and in dot-dash lines the extended position of the movable slides;

FIGURE 2 is a front elevational view of the equalizer slide extension of FIGURE 1, the dot-dash lines illustrating the extended position of the left-hand movable slide;

FIGURE 3 is an end view of the equalizer slide extension of FIGURES 1 and 2 as seen from the right-hand end of FIGURE 2;

FIGURES 4, 5 and 6 are vertical sectional views through the equalizer slide extension of FIGURES 1 and 2 taken substantially on the lines 4—4, 5—5 and 6—6 of FIGURE 2 looking in the direction of the arrows;

FIGURE 7 is an enlarged perspective view of the toothed gear assembly of the present invention;

FIGURE 8 is an enlarged fragmental perspective view of one of the rack bars employed in the equalizer slide extension of FIGURES 1 and 2; and FIGURE 9 is an enlarged fragmental front elevational view of the right end of the equalizer slide extension of FIGURE 2 with parts broken away and in section to illustrate the pocketed roller bearing carried by the trailing end of the left hand slide of FIGURE 2 and the pocketed roller carried by the rearmost stationary slide channel of FIGURE 2.

With continued reference to the drawings wherein like reference numerals are employed throughout to indicate the same parts, numeral 10 indicates generally the equalizer slide extension of this invention in its entirety. Equalizer slide extension 10 is made up of front and rear slide guide channels 11 and 12 telescopically receiving left and right extendable movable slides 13 and 14, respective rack bars 15 and 16 spot welded as indicated at 17 (FIGURE 2) to the inner faces of the walls 18 of movable slides 13 and 14, and a common gear wheel assembly 19 journalled in strap-like socket formations 21 struck out of the abutting back walls 22 of guide channels 11 and 12 above and below laterally aligned through slots 23 (FIGURE 4) formed in back walls 22 intermediate their ends and slightly below the longitudinal center line of walls 22.

The respective guide channels 11 and 12 are identical channel members of generally rectangular configuration in cross-section (FIGURES 3 through 6) having their back walls 22 spot welded together in back-to-back abutting relation and are welded along their lower edge walls 24 to the back wall of an inverted, open sided channel section 25 adapting the guide channel assembly to be fixedly connected to one side of the centered table base (not shown) in conventional well known manner. The front sides of guide channels 11 and 12 opposite back walls 22 are open from end to end between the upwardly and downwardly directed flanges 26 and 27 and the back walls 22 inwardly from their opposite ends are punched inwardly between longitudinally spaced shear lines to provide limit stops 28 and 29 (FIGURES 1 through 6) for a purpose to be presently pointed out.

Referring for the moment to FIGURES 4 and 7, gear assembly 19 comprises a toothed gear wheel 31 having integrally formed, oppositely directed stub shafts 32 concentrically disposed with respect to the opposite faces and separately formed disk-like plates 33 centrally apertured to freely pass the respective stub shafts 32. In producing and assembling the equalizer slide extension of this invention, the gear receiving openings 23, the strap-like socket formations 21 and the limit stops 28 and 29 are formed in the respective slide guide channel walls 22 prior to welding channels 11 and 12 in back-to-back relation. The gear assembly 19 is then placed in the upturned socket formations of one of the slide guide channels and the mating slide guide channel, with its strap-like socket formations 21 and opposite ends aligned with the corresponding parts of the one slide guide channel, is placed on top in back-to-back relation and the two channels are spot welded together. As a result, gear assembly 19 is permanently but loosely journalled between the strap-like socket formations 21 in straddling relation to the welded back walls 22 with its toothed perimeter disposed to rotate adjacent the oppositely directed open faces of guide channels 11 and 12.

The movable slides 13 and 14 are also identical channel members of generally rectangular configuration in cross-section (FIGURES 3 through 6) having their back walls deformed to form an offset vertically centered crown 35 extending longitudinally from end to end, an opposite open wall defined by upwardly and downwardly directed flanges 36 and 37, and top and bottom edge walls 38 and 39. The dimensions of the channel members for slides 13 and 14 are sufficiently smaller than the interior dimensions of the channel members for slide guide channels 11 and 12 to assure a definite clearance between walls 38 and 39 and the opposing edge walls of the slide guide channels and a free sliding fit between (1) upwardly and downwardly directed flanges 36 and 37 and the opposing areas of back walls 22 of slide guide channels 11 and 12 and (2) the upwardly and downwardly directed flanges 26 and 27 and the opposing areas of the back walls of movable slides 13 and 14 lying outside of crown 35. The crown section 35 as will be apparent from an inspection of FIGURES 3 through 6, protrudes laterally beyond flanges 26 and 27 of guide channels 11 and 12 to provide a mounting face for table top board mounting brackets 40.

To control the sliding movement of movable slides 13 and 14 in slide guide channels 11 and 12 and assure a horizontal sliding movement of slides 13 and 14 in slide guide channels 11 and 12 and avoid canting of slides 13 and 14 under the weight forces when extended, the present invention provides laterally extending, pocket-like indentations 41 (FIGURES 3 and 9) in the upper slide walls 38 adjacent their trailing ends and in the bottom slide guide channel walls 24 adjacent their entry ends, the ends through which slides 13 and 14 move, to receive hard, needle bearing type rollers 42 (FIGURES 3 and 9) preferably of nylon or similar plastic. These rollers 42 provide longitudinally spaced anti-friction bearings which support the weight of the movable slides and the table top boards secured thereto during sliding movement assuring friction free, smooth, horizontal sliding of the respective slides in their guide channels. In accomplishing this, the rollers 42 carried by the pockets 41 in bottom walls 24 of slide guide channels 11 and 12 (see FIGURE 2) are located to be disposed about midway of the length of extended slides 13 and 14 (see position of left pocket 41 to dot-dash line representation of slide 13 in FIGURE 2) while the rollers 42 carried by the trailing ends of the extended slides 13 and 14 are located to be disposed about midway of the length of respective slide guide channels 11 and 12 (see side-by-side overlapped position of dot-dash ends of slides 13 and 14 in FIGURE 1) This relationship of rollers 42 is of importance in assuring horizontal sliding movement of slides 13 and 14 and a level table surface as will be presently pointed out.

The crown portions of the respective slides, inwardly from their leading ends and rearwardly from the trailing brackets 40, are punch cut at points 45 and 46 to form respective upwardly and downwardly directed truncated triangular tabs 47 and 48.

Assuming that rack bars 15 and 16 have been reasonably accurately fixed to slides 13 and 14 with their end rack teeth 45 (FIGURE 8) equidistantly spaced from the trailing slide ends and that rollers 42 have been deposited in the four pockets 41 previously described, assembly of the equalizer slide assembly 10 is effected by inserting slides 13 and 14 endwise, trailing end first, into their respective guide channels 11 and 12 and moving them equally inwardly to simultaneously mesh the trailing end rack bar teeth 45 with gear wheel 31. Upon meshing engagement, inward feeding of both slides is continued until the leading ends of slides 13 and 14 are aligned with the entry ends of guide channels 11 and 12. If both slide ends do not align at the same time, the slides can be withdrawn and reassembled to mesh with gear wheel 31 in desired sequence to secure proper alignment. When proper alignment is effected, tongues 47 and 48 are bent inwardly around their bases to a position to dispose them in the path of limit stops 28 and 29 as will clearly appear from an inspection of FIGURES 3 through 6.

Referring for the moment to FIGURE 2 and the FIGURE 9 showing of the upper roller 42 at the trailing end of slide 13, it will be appreciated that the lower roller 42 at the entry end of guide channel 11 provides a fulcrum support for the leading end of slide 13 and that the trailing end is maintained in horizontal trailing alignment to the supported leading end due to the conventional interfitting pin and socket cooperation (not shown) of the abutting table top board edges which are supported by the upstanding, elongated guide channel formations 51 (FIGURES 1 and 2) so long as slides 13 and 14 are in their fully retracted position. The top board mounting brackets 40, in this position of slides 13 and 14, serve as suspension links between the horizontally supported table top boards and the trailing portions of slides 13 and 14 extending inwardly from the entrance end support rollers 42. As the slides are moved outwardly to receive one or more insert leaves, the fulcrum position of the entrance end support rollers 42 shifts inwardly from the leading end of slides 13 and 14 and the weight forces of the now protruding leading ends of slides 13 and 14 and their supported table top boards establish a gradually increasing downward force component on the leading slide ends tending to rotate slides 13 and 14 around the entrance end fulcrum support rollers 42. This rotational force presses the trailing ends of slides 13 and 14 against the upper trailing end rollers 42 with increasing force until slides 13 and 14 reach their maximum protrusion at which time the lower entrance end fulcrum support rollers 42 are disposed about midway of the length of slides 13 and 14. At this time, the rotational force component reaches its maximum magnitude. However, the relative equal length force lever arms distribute this maximum force approximately equally between the lower and upper bearing rollers 42 and the roller bearing action is such that there is no appreciable frictional drag, no perceptible canting of the slides 13 and 14 at any time, and no undue stress imposed on the gear assembly 19 which acts substantially as a free floating pinion assuring equal relative movement of slides 13 and 14 at all times.

The engagement of tongues 47 and 48 with the opposite edges of limit stops 28 and 29 positively prevents disassociating sliding movement of slides 13 and 14 in actual use and in handling, in shipping and assembling the slide extensions with a table base and the table top boards.

The invention may be embodied in other specific forms without departming from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. An equalizer slide extension for extensible tables comprising slide guide means providing a pair of oppositely facing, open ended slide receiving passageways at opposite faces of a longitudinal double thickness wall having a through passage in the form of a longitudinally extending slot midway of its ends, the upper and lower slot defining wall portions midway of the length of said slot being slitted parallel to said slot and deformed to form opposing arcuate wall segments at the upper and lower slot edges cooperating to form vertically aligned shaft journal sockets; gear means having oppositely directed stub shafts journalled in said vertically aligned shaft journal sockets and its peripherally toothed body straddling said slot so as to dispose respective portions of said body in overhanging relation in said oppositely facing, open ended, slide receiving passageways; respective slide means including longitudinally extending rack bars disposed in said oppositely facing, open ended, slide receiving passageways with said rack bars in meshing engagement with said respective portions of said peripherally toothed body of said gear means; respective laterally extending roller bearing receiving pockets formed by depressed portions in said guide means adjacent the diagonally opposed lower ends of said passageways; respective laterally extending roller bearing receiving pockets formed by depressed portions in said slide means adjacent the respective upper ends remote from said lower ends of said passageways; and respective needle bearing elements disposed in said laterally extending roller bearing pockets, said needle bearing elements operatively supporting said slides for free, level, sliding movement longitudinally of said passageways.

2. The equalizer slide extension of claim 1 wherein said slide guide means comprises a pair of open sided channel members fixedly secured in back-to-back relation to form said double thickness wall, said channel member back walls being respectively pre-slotted midway of their ends and slitted and deformed inwardly adjacent said slots to form, said through passage, said cooperating arcuate wall segment defining aligned shaft journal sockets.

3. The equalizer slide extension of claim 2 wherein said pair of open sided channel members adjacent one end of their respective lower edge walls are depressed to form said laterally extending roller bearing receiving pockets.

4. The equalizer slide extension of claim 2 wherein said slide means each comprise an open side channel member dimensioned along its opposite edges to slidingly interfit within the respective edges of said channel members forming said slide guide means with their respective edge walls spaced slightly from the inner faces of the edge walls of the channel members forming said slide guide means, said slide means channel members having their back walls between said opposite edges projecting through the open sides of said slide guide means channel members to form a closure therefor.

5. The equalizer slide extension of claim 4 wherein said rack bars comprise respective elongated members of L-shaped configuration in cross-section spot welded along one leg portion to the inner back wall face of the slide means channel members and the other leg portion is formed along its edge to provide rack bar teeth.

References Cited
UNITED STATES PATENTS

| | | | |
|---|---|---|---|
| 978,730 | 12/1910 | Gaut | 308—3.6 |
| 1,123,673 | 1/1915 | Breon | 308—3.8 |
| 1,495,301 | 5/1924 | Harmon | 197—69 |
| 1,604,457 | 10/1926 | Lowe | 308—3.8 |
| 1,692,618 | 11/1928 | Bowers | 308—3.6 |
| 2,003,926 | 6/1935 | Buncan | 308—3.6 |
| 2,323,604 | 7/1943 | Hyland | 308—3.8 |
| 2,675,277 | 4/1954 | McCellan | 308—3.8 |
| 2,676,858 | 4/1954 | Duncan | 308—3.6 |
| 2,692,802 | 10/1954 | Kurtson | 308—3.8 |
| 2,695,821 | 11/1954 | Crumling | 308—6 |
| 2,731,317 | 1/1956 | Duncan | 308—3.6 |
| 3,215,475 | 11/1965 | Mason | 308—3.6 |
| 3,222,494 | 12/1965 | O'Connor | 308—6 |

FOREIGN PATENTS 820,907 11/1937 France.

MARTIN P. SCHWADRON, *Primary Examiner.*

L. L. JOHNSON, *Assistant Examiner.*

UNITED STATES PATENT OFFICE
CERTIFICATE OF CORRECTION

Patent No. 3,337,274                              August 22, 1967

Eric Green

It is hereby certified that error appears in the above numbered patent requiring correction and that the said Letters Patent should read as corrected below.

Column 2, line 22, after "slide" insert -- guide --.

Signed and sealed this 23rd day of July 1968.

(SEAL)
Attest:

Edward M. Fletcher, Jr.                              EDWARD J. BRENNER

Attesting Officer                                       Commissioner of Patents